United States Patent
Okada et al.

[11] Patent Number: 5,734,241
[45] Date of Patent: Mar. 31, 1998

[54] BRAKE CONTROL SYSTEM OF A MOTOR

[75] Inventors: Tadashi Okada, Shiga-ken; Akira Inui, Hikone, both of Japan

[73] Assignee: Nidec Corporation, Kyoto, Japan

[21] Appl. No.: 686,453

[22] Filed: Jul. 25, 1996

Related U.S. Application Data

[62] Division of Ser. No. 213,859, Mar. 16, 1994, Pat. No. 5,604,412.

[30] Foreign Application Priority Data

Mar. 19, 1993 [JP] Japan ................. 5-59991
Mar. 22, 1993 [JP] Japan ................. 5-85110
Mar. 31, 1993 [JP] Japan ................. 5-98524

[51] Int. Cl.$^6$ ............................................. H02P 6/24
[52] U.S. Cl. ............ 318/366; 318/254; 318/369; 318/430; 318/703
[58] Field of Search ............... 318/138, 254, 318/362, 364, 366, 369, 373, 374, 430, 439, 703

[56] References Cited

U.S. PATENT DOCUMENTS

| | | |
|---|---|---|
| 3,774,648 | 11/1973 | Brown et al. . |
| 3,783,359 | 1/1974 | Malkiel . |
| 3,854,080 | 12/1974 | Bambara et al. ............. 318/466 X |
| 4,127,799 | 11/1978 | Nakamura et al. ............ 318/138 X |
| 4,225,811 | 9/1980 | Kühnlein et al. ............. 318/138 X |
| 4,386,298 | 5/1983 | Toshimitu ................... 318/254 |
| 4,406,981 | 9/1983 | Watanabe et al. . |
| 4,549,120 | 10/1985 | Banno et al. . |
| 4,622,499 | 11/1986 | Squires et al. . |
| 4,629,949 | 12/1986 | Senso . |
| 4,833,378 | 5/1989 | Furue et al. . |
| 5,001,406 | 3/1991 | Peterson . |
| 5,010,283 | 4/1991 | Kitajima et al. . |
| 5,151,637 | 9/1992 | Takada et al. . |
| 5,173,645 | 12/1992 | Naito . |
| 5,220,257 | 6/1993 | Yoshino et al. . |
| 5,287,044 | 2/1994 | Izawa et al. . |

*Primary Examiner*—Bentsu Ro
*Attorney, Agent, or Firm*—McCormick, Paulding & Huber

[57] ABSTRACT

A brushless motor includes a stationary member; a rotating member rotatably supported with respect to the stationary member; a stator provided in the stationary member and provided with a stator coil for generating current magnetic field under an exciting state; and a rotor magnet provided in the rotating member for obtaining a revolutionary power due to an electromagnetic mutual effect with the current magnet field of the stator coil. The rotor magnet is formed such that segment-shaped magnets are placed annularly with predetermined gaps circumferentially. The gaps are filled with a magnetic resin material.

3 Claims, 17 Drawing Sheets

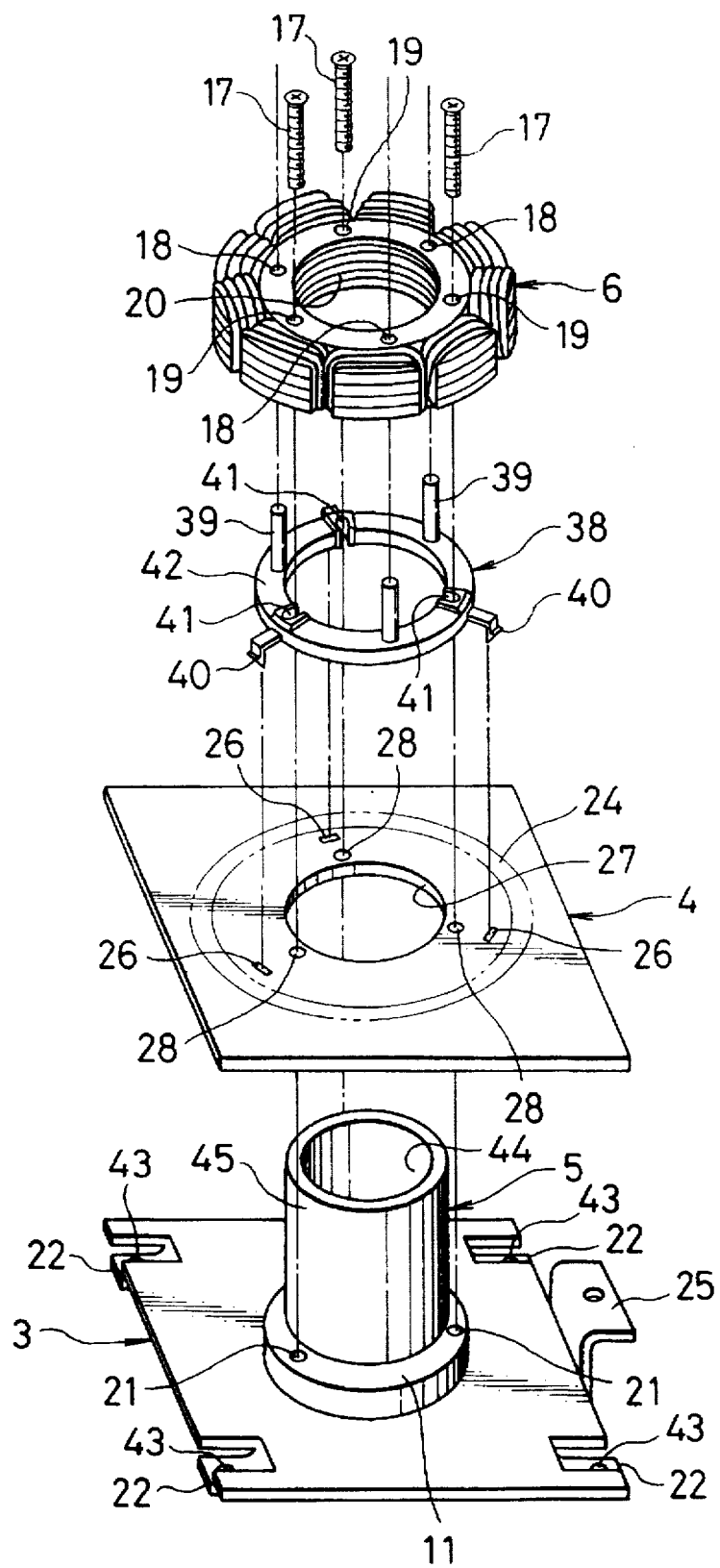
F I G. 3

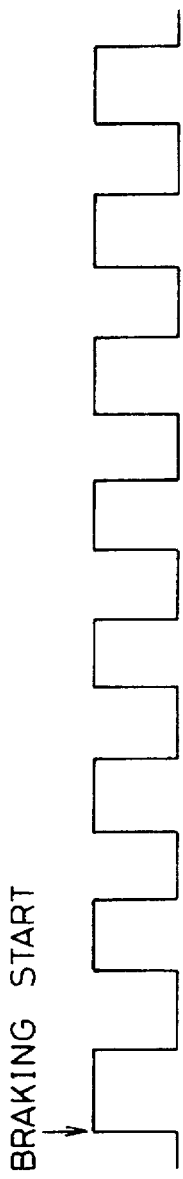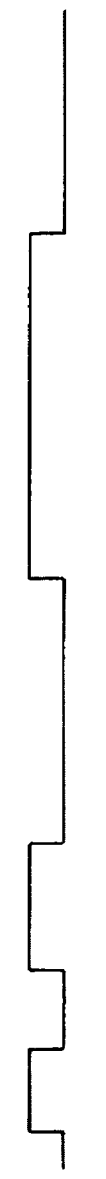
FIG.11A  REFERENCE CLOCK SIGNAL $f_0$
FIG.11B  ROTATIONAL FREQUENCY SIGNAL
FIG.11C  BRAKE CURRENT
FIG.11D  ROTATING DIRECTION
FIG.11E  STOP DETECTION SIGNAL

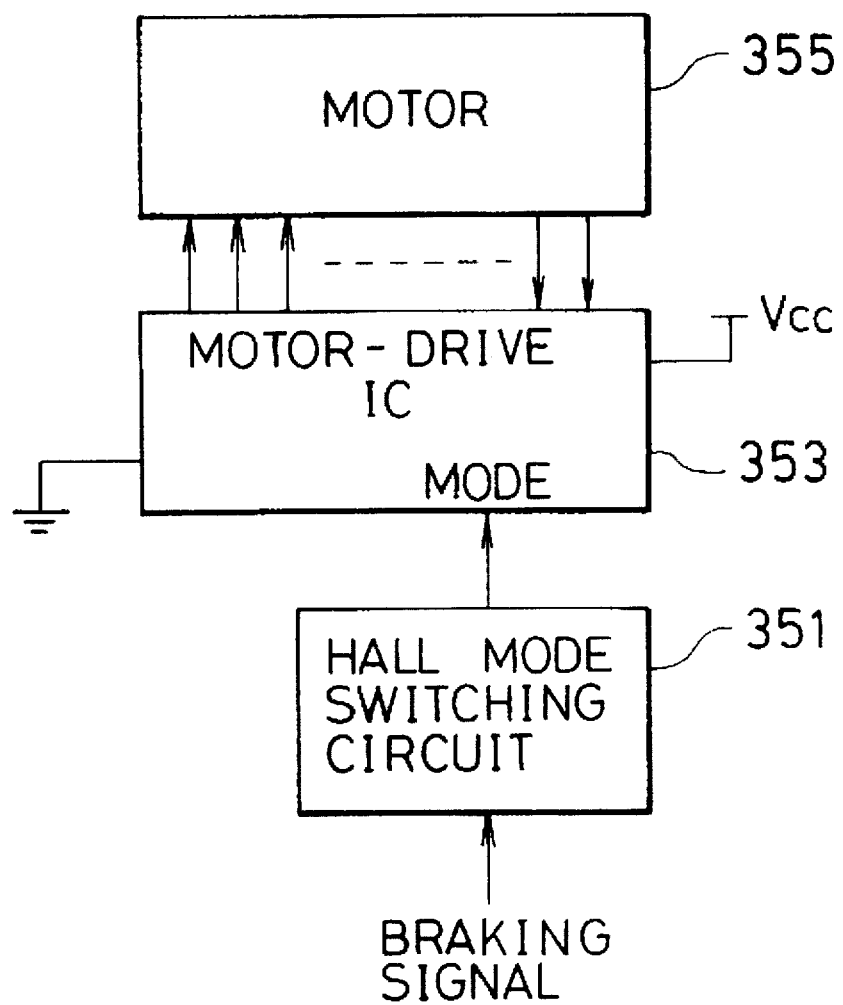
F I G. 14

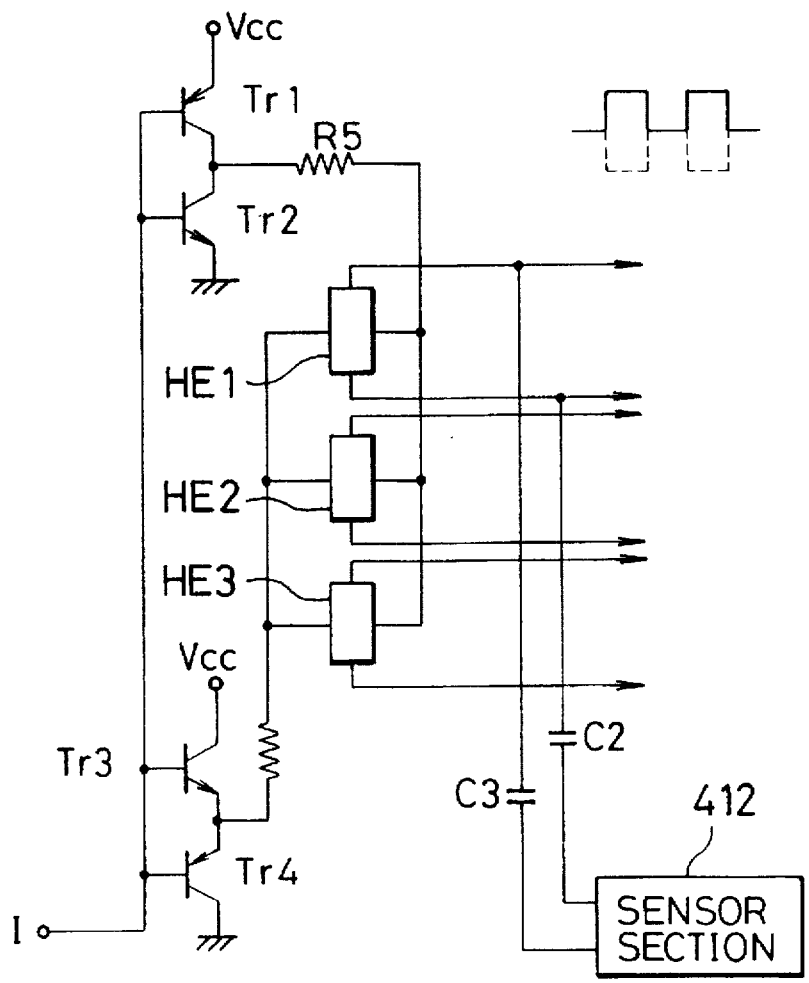
PRIOR ART
FIG. 16
PRIOR ART
FIG. 17A
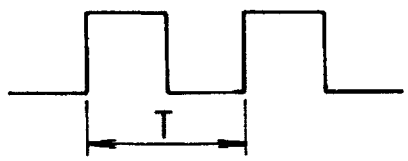
PRIOR ART
FIG. 17B
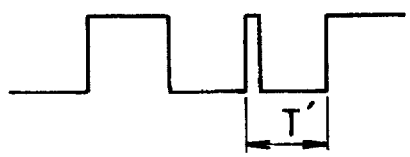

BRAKE CONTROL SYSTEM OF A MOTOR

This is a divisional application of application Ser. No. 08/213,859 filed on Mar. 16, 1994, now U.S. Pat. No. 5,604,412.

BACKGROUND OF THE INVENTION

1. Field of the Invention

The present invention relates to a brushless motor and a control circuit thereof to be mounted on various office automation instruments such as plane paper copiers, laser printers, and optical magnetic disk drives.

2. Related Art

A small DC motor to be mounted on an office automation instrument such as a plane paper copier and a printer is provided with a stator fixed to a bracket and a rotor oppositely placed and coaxially rotatably supported by the stator. A rotor magnet, with a predetermined number of magnetic poles, is fixed to a yoke of the rotor. When a predetermined power is supplied to the stator, the rotor rotates by electromagnetic action.

In case of a brushless motor which generates a comparatively large torque, segment-shaped ferrite magnets are generally used as the rotor magnet. More specifically, a predetermined number of ferrite magnets are annularly placed and fixed along with the yoke of the rotor, to thereby obtain the predetermined number of magnetic poles.

However, the brushless motor constructed as described above poses the following problems on forming the rotor magnet.

Segment-shaped magnets must be stuck together annularly along the yoke of the rotor. In order to arrange the magnets uniformly while keeping a constant interval circumferentially, an arrangement of the magnets must be performed with high precision by using a positioning jig, resulting in a troublesome work.

When the segment-shaped magnets are arranged along the yoke of the rotor without providing a constant interval, gaps are caused between the adjacent magnets. The existence of the gaps will contribute to increase the reluctance torque. For this reason, cogging is increased and the rotational fluctuation may be caused.

Further, in order to provide an index magnet for rotation detection and a multi-pole magnet for frequency generation (FG) integrally formed with the rotor magnet, a further work is required for fixing and positioning the magnets.

A brushless motor having the above-described structure and sensors for detecting the rotational position of the rotor has been known. In most cases, the brushless motor is controlled by an electronic circuit constituted in a semiconductor chip. In this case, the timing of generating the magnetic field at the stator side is controlled by detecting the position of the rotor by the sensors. Hall elements have been conventionally used as the sensors. FIG. 15 shows an example of a rotation control circuit adapted for a three-phase spindle motor. In FIG. 15, HE1 through HE3 denote Hall elements. Hall amplifiers HA1 through HA3 are connected to the Hall elements HE1 through HE3, respectively.

Each output of the Hall amplifiers HA1 through HA3 is connected to a control section 401 which controls exciting currents supplied to the three-phase stator coils u, v, w in accordance with the output signals of the Hall elements HE1 through HE3. The outputs of the control section 401 are connected to a driver section 402. Upon receiving the output signals from the control section 401, the driver section 402 supplies exciting currents to the stator coils u, v, w.

An output of a current detecting circuit (amplifier) 403 is also supplied to the control section 401. A negative input terminal of the current detecting circuit 403 is connected to one terminal of a resistor R1 through which an exciting current supplied from the driver section 402 to one of the stator coils u, v, w flows. A positive input terminal of the current detecting circuit 403 is connected to a node of series-connected resistors R2 and R3 provided between a power supply voltage Vcc and a ground voltage.

The current detecting circuit 403 receives a conversion voltage V of the exciting current converted by the resistor R1, and a reference voltage Vs obtained by dividing the power supply voltage Vcc by means of the resistors R2 and R3. When the motor overruns or the number of revolutions becomes extremely high by some reason, the exciting currents supplied to the coils u, v, w increase. The current detecting circuit 403 detects this increase and supplies a detection signal to the control section 401. Upon receiving the detection signal, the control section 401 ceases the supplement of the exciting currents to the coils u, v, w, to thereby stop the motor.

However, such a conventional rotation control circuit, particularly the current detecting circuit 403 has the following problem.

According to the current detecting circuit 403, the reference voltage Vs is obtained by dividing the power supply voltage Vcc by the resistors R2 and R3. The resistance values of the resistors R2 and R3 vary within a range of approximately 10%. For this reason, the reference voltage Vs changes in accordance with the variation of the resistance values and also highly depends on the fluctuation of the power supply voltage Vcc.

When such a brushless motor which is in a constant revolution is to be ceased within a predetermined period of time, a brake control (braking operation) is performed. According to a brake circuit of a conventional brushless motor, a brake operation is performed at full torque. A rotational frequency is detected by one Hall sensor H1 of three Hall sensors H1, H2, H3 detecting a rotation of the rotor, as shown in FIG. 18. Upon detecting that the rotational frequency becomes 1/n of the rated frequency, a deceleration detection circuit 450 switches the brake circuit to further perform the brake operation with a small torque during a time interval T set by a delay circuit 451, to thereby smoothly stop the rotor.

According to the above structure, after the number of revolutions (1/n of the rated frequency) is detected and the delay time T has elapsed, the brake currents are cut off. However, the detected number of revolutions will change depending on the rated number $N_B$ of revolutions.

Assume now that as shown in FIG. 19 the delay time T is set to be tailored to the rated number of revolutions, and further brake operation is performed for the time T after the number of revolutions reaches $N_B/n$ by performing the brake operation by the full torque, to thereby completely cease the rotor. However, when the number of revolutions is $N_A$ larger than $N_B$, even if the brake operation is performed by the full torque until the number of revolutions reaches $N_A/n$ and further brake operation is performed for the time T, the brake operation is insufficient and thus the rotor is not completely stopped. In contrast, when the rated number of revolutions is $N_C$ smaller than $N_B$, the brake operation is performed at full torque until the number of revolutions reaches $N_C$, and further brake operation is performed for the time T, the brake operation is excessive and thus the rotor rotates in reverse direction.

As described above, according to a conventional brake operation circuit, the brake operation may not be performed stably depending on the value of the rated number of revolutions.

SUMMARY OF THE INVENTION

An object of the present invention is to provide a brushless motor which can be manufactured easily and reduce the cogging while using the rotor magnet constituted by segment-shaped magnets.

Another object of the present invention is to provide a brushless motor which permits magnets for the rotation detection and/or the frequency generation to be provided on the rotor easily and accurately.

A further object of the present invention is to provide a brushless motor which can perform the brake operation stably independent of the value of the rated number of revolutions and which can stop the rotation rapidly.

According to the first aspect of the present invention, the brushless motor includes a stator and a rotor coaxially and rotatably supported by the stator, the rotor magnet is formed such that segment-shaped magnets are arranged annularly with a predetermined gaps circumferentially, and a magnetic resin material is inserted into the gaps.

In the brushless motor constructed above, the segment-shaped magnets placed annularly and circumferentially in the rotor magnet are integrally formed by a magnetic resin material. For this reason, the individual segment-shaped magnets are not required to be stuck and can be placed accurately. Further, a magnetic resin material is inserted into the gaps between the adjacent segment-shaped magnets, the magnetic flux from each of the segment-shaped magnets is closed and never diverged. For this reason, there is an advantage that the cogging due to the rotor magnet and the stator can be reduced.

According to the present invention, the rotation control circuit of a motor includes: a control section for controlling exciting currents to be supplied to the stator coils of a motor in accordance with an output signal of a sensor for detecting a rotation position of the motor; a driver section for supplying predetermined exciting currents to the stator coils in accordance with the control by the control section; and a current detecting circuit for sending an output signal to the control section to stop the supplement of the exciting currents when the exciting currents supplied from the driver section to the stator coils become larger than a predetermined value, wherein the current detecting circuit receives a converted voltage of one of the exciting currents and a reference voltage, and outputs a signal to the control section when the converted voltage is larger than the reference voltage, and the reference voltage is a forward voltage of a PN junction device.

According to the rotation control circuit of the motor constructed as above, the current detecting circuit outputs a supplement stop signal of the exciting currents to the control section when the converted voltage becomes larger than the reference voltage. Therefore, the overruns of the motor can be prevented. The reference voltage is obtained by the forward voltage of the PN-junction. Since the change of the forward voltage of the PN-junction device is small, the variations of the reference voltage is small.

Further, according to the present invention, a brake circuit of a motor includes: a speed detection circuit for detecting a rotating speed of a motor; a deceleration detection circuit for detecting that a number of revolutions becomes a predetermined value or less with respect to a rated number of revolutions; a rotational direction detection circuit for detecting a rotational direction of the motor; a current control circuit, connected to the deceleration detection circuit and rotational direction detection circuit. The current control circuit controls a supplement of currents to stator coils of the motor, to perform a brake operation with a current having a first current value, to perform a brake operation with a current having a second current value smaller than the first current value when the deceleration detection circuit detects that the number of revolutions is a predetermined value or less with respect to a rated number of revolutions, and to stop the supplement of the second current to the stator coils when the rotational direction detection circuit detects that the motor starts a reverse rotation.

According to the above arrangement, the brake operation is performed at full torque with the first brake current of the first current value until the number of revolutions reaches a predetermined value after the brake operation is started. After the rotation speed is decelerated to a predetermined number of revolutions, the brake operation is performed with torque smaller than the full torque with the second brake current of second current value. When the rotor is completely stopped or starts the reverse rotation, the supplement of power to the stator coils is ceased. Due to this, the stable brake operation can always be performed independent of the value of the rated number of revolutions.

BRIEF DESCRIPTION OF THE DRAWINGS

FIG. 3 is a perspective view in which a part of the brushless motor shown in FIG. 1 is developed;

FIGS. 4A and 4B show a coupling member shown in FIG. 1 in which FIG. 4A is a plane view thereof and FIG. 4B is a cross sectional view thereof;

FIGS. 11A to 11E are timing charts showing signals of components shown in FIG. 9;

FIG. 14 is a circuit diagram of the seventh embodiment of the invention;

FIG. 16 is a circuit diagram showing a main part of another example of a conventional rotation control circuit;

FIGS. 17A and 17B show waveforms of output signals of Hall elements shown in FIG. 15;

DETAILED DESCRIPTION OF THE PREFERRED EMBODIMENTS

First Embodiment

A brushless motor according to the first embodiment of the present invention will now be described below.

Figure 1:
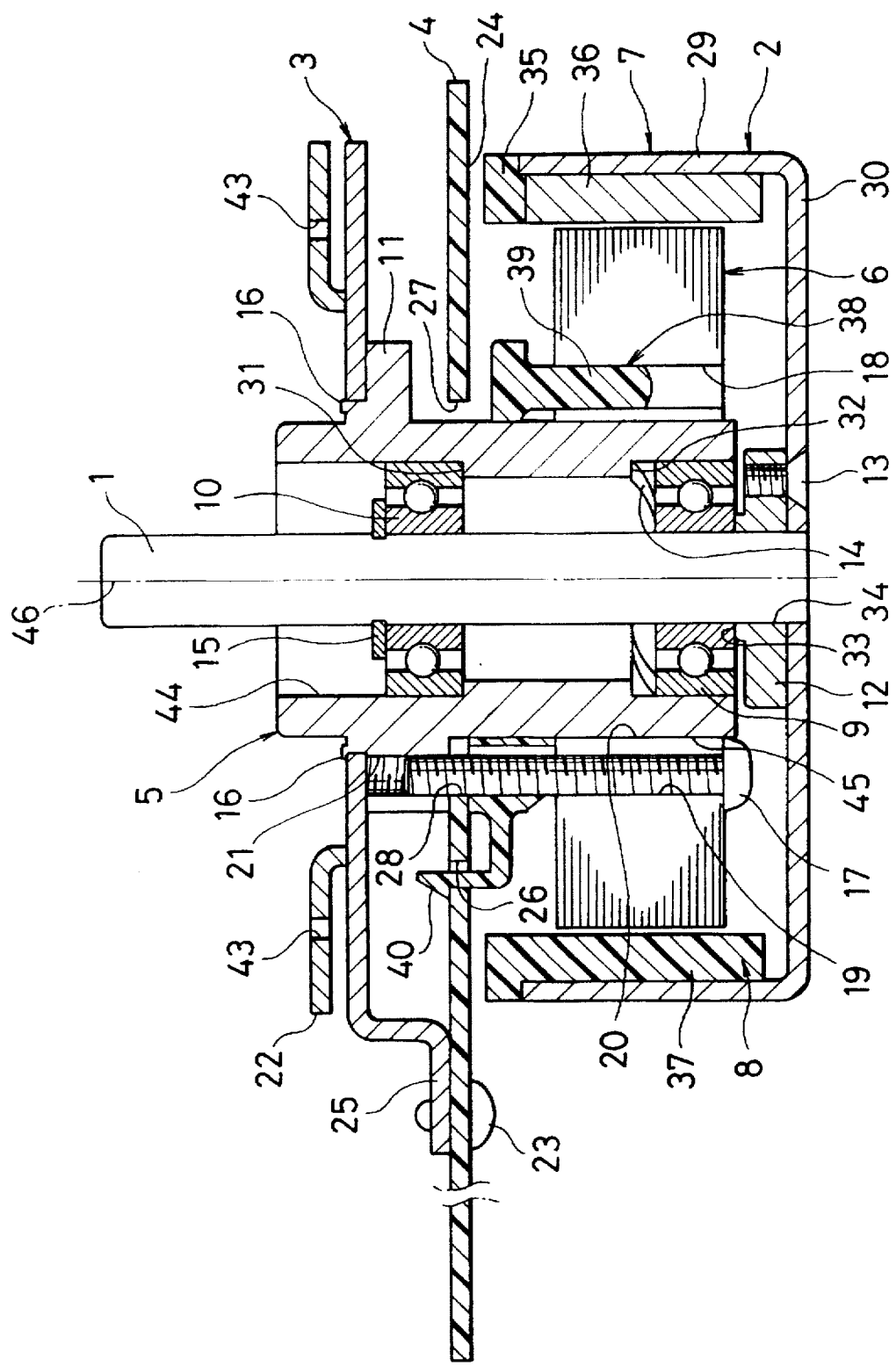
FIG. 1 is a cross sectional view showing an entire brushless motor according to the first embodiment of the present invention.
Figure 2:
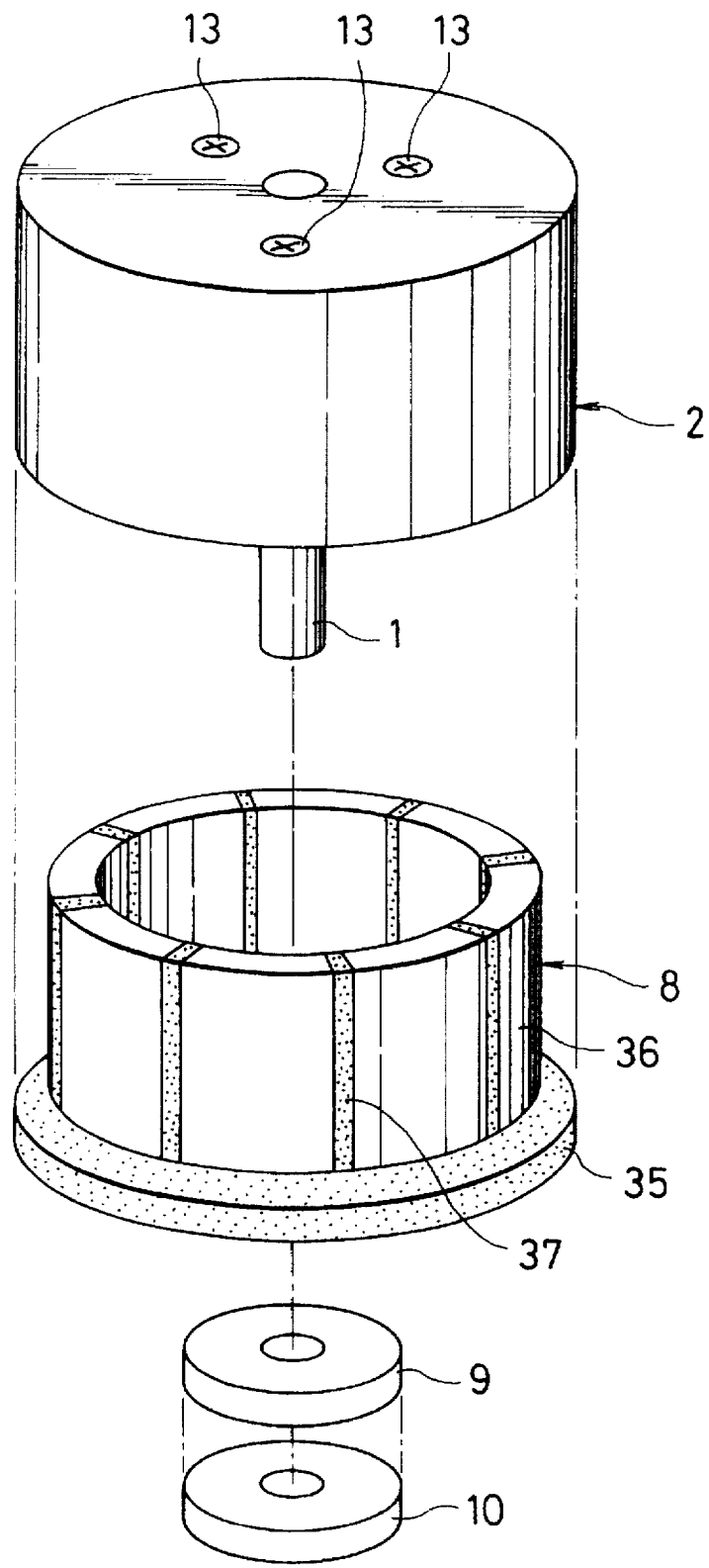
FIG. 2 is a perspective view in which a rotor of the brushless motor shown in FIG. 1 is developed.

FIG. 1 is a cross sectional view showing the entire brushless motor, and FIGS. 2 and 3 are perspective views developed into an axial direction. In FIGS. 1 through 3, a member 3 denotes a fixing frame which permits the motor to be mounted on a unit which is not shown. The fixing frame 3 is formed of a thin sheet steel plate. Fixing portions 22 formed like tongues are provided at four corners of the fixing frame 3. The motor is fixed on the unit through holes 43 formed in the fixing portions 22. The fixing portions 22 contribute to increases the substantial thickness of the fixing frame 3.

A cylindrical portion 5 is fixed to the fixing frame 3. The cylindrical portion 5 is formed of aluminum or brass. An outwardly extending flange portion 11 is integrally formed on an external periphery of the cylindrical portion 5. The fixing frame 3 is externally engaged with, caulked, and integrally fixed to the side of the flange portion 11. Three tapped holes 21 are provided on the flange portion 11 through which a stator to be described later is fixed by screws. Further, a print circuit board 4 is mounted on the fixing frame 3. The print circuit board 4 is fixed by a mount screw 23 at a curved portion 25 formed at one end of the fixing frame 3.

A stator 6 is externally engaged with an external periphery 45 of the cylindrical portion 5. The stator 6 comprises an armature coil which includes a core formed by stacked thin electromagnetic steel plates and a wire winding the armature coil. An internal periphery 20 excavated in a center portion of the stator 6 is engaged with the external periphery 45 of the cylindrical portion 5. Mount screws 17 are screwed into the screw hole 21 of the flange portion 11 through holes 18 provided in the stator 6 and holes 28 provided in the printed circuit board 4, to thereby fix the stator 6 to the cylindrical portion 5. In other words, the stator 6 is fixed to the fixing frame 3 (the flange portion 11 of the cylindrical portion 5) through a coupling member 38 and a print circuit board 4.

Figure 4A:
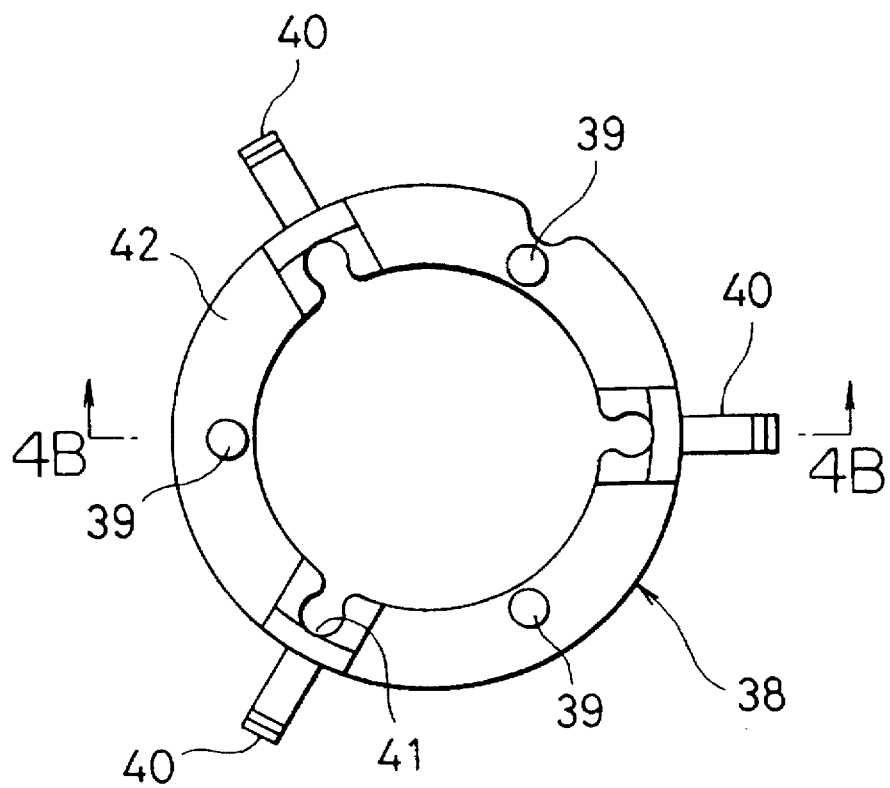
Figure 4B:
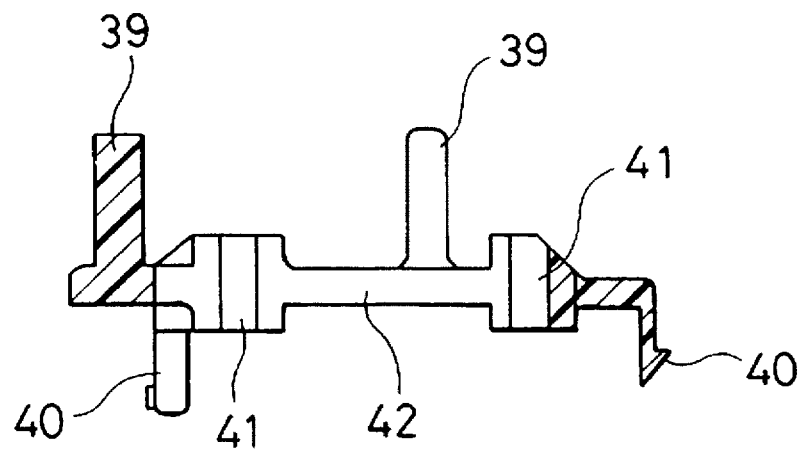

FIG. 4A is a plane view of the coupling member 38 and FIG. 4B is a cross sectional view taken along the line 4B—4B' in FIG. 4A. The coupling member 38 is formed of an insulative resin material as shown in FIG. 4B. As is apparent from FIGS. 3, 4A and 4B, the coupling member 38 includes an annular base portion 42, three protruding portions 39 and three engaging pieces 40, which are integrally formed on the annular base portion 42. The protruding portions 39 and the engaging pieces 40 are provided circumferentially and equidistantly.

Similarly, three groove portions 41 are circumferentially and uniformly provided on an inner periphery of the annular base portion 42.

The protruding portions 39 formed on the annular base portion 42 protrude in one direction along an axial line 46 and are formed corresponding to the through holes 18 excavated in the stator 6. The engaging pieces 40 externally radially protrude and ends thereof are formed vertically and downwardly (in the other direction along the axial line 46). The ends of the engaging pieces 40 are provided corresponding to the holes 26 of the print circuit board 4. Tip portions of the engaging pieces 40 is approximately tapered and is engagedly fixed in the holes 26 formed on the print circuit board 4, due to an elastic deflection of the engaging pieces 40 themselves. The groove portions 41 serves as insertion portions of the mount screws 17 used for fixing the stator 6 to the flange portion 11.

The coupling member 38 exists between the stator 6 and the print circuit board 4 and achieves the following functions. The coupling member 38 serves to electrically insulate the stator 6 from the print circuit board 4, and to position them circumferentially and axially. The coupling member 38 is used to provisionally support the stator 6 and the print circuit board 4 during assembling them. In order for the provisional supporting, the stator 6 and the print circuit board 4 are provisionally assembled. The protruding sections 39 of the coupling member 38 are inserted and held into the thorough holes 18 of the stator 6, and the engaging pieces 40 are engaged with the holes 26 of the print circuit board 4 due to their elastic deflection. Under this condition, the stator 6 and the print circuit board 4 are fixed to the fixing frame 3 with the mount screws 17. Since the stator 6 and the print circuit board 4 are positioned circumferentially, the rotational timing of the stator 6 can be determined accurately.

The coupling member 38 is an assembling auxiliary member used when the stator 6 and the print circuit board 4 are fixed to the fixing frame 3. After these members are fixed with each other, the coupling member 38 serves as an insulating material to keep the electrical isolation between the stator 6 and the print circuit board 4.

A pair of bearings 9 and 10 are mounted in the inner peripheral portion 44 of the cylindrical portion 5. The rotor 2 is rotatably supported by the bearings 9 and 10. The rotor 2 comprises a rotor yoke 7 integrally fixed to the shaft 1, and a rotor magnet 8 provided in the inner peripheral portion of the annular wall 29 of the york 7. The shaft 1 is fixedly engaged with the base portion 12 provided in a horizontal portion 30 of the rotor yoke 7. The base portion 12 and the rotor yoke 7 are fixed by the mount screws 13.

The rotor magnet 8 is arranged such that segment-shaped ferrite magnets 36 are annularly placed, to provide a predetermined number of poles (8 poles in the embodiment), as shown in FIG. 2. The rotor magnet 8 faces with the stator 6 in a radial direction. The segment-shaped magnets 36 are circumferentially equidistantly arranged. A magnetic resin material is provided (filled) in each gap 37 between adjacent two segment-shaped magnets 36. The magnetic resin material may be a mixture of a polyamide resin and a magnetic material such as ferrite. A resin material forming portion 35 formed of a similar resin material as the magnetic resin material is annularly provided at the end of the rotor magnet 8. That is, the rotor magnet 8 is obtained by integrally forming the segment-shaped magnets 36 with the resin.

For this reason, the segment-shaped magnets 36 need not be stuck nor arranged circumferentially and equidistantly during assembling the motor. Further, since the resin material filled in the gap 37 has magnetism, the fluxes between poles do not diverge. Accordingly, the cogging torque with respect to the stator 6 can be reduced.

N and S poles are alternatively magnetized circumferentially at the resin material forming portion 35. The resin material forming portion 35 corresponds (faces) to the FG (Frequency Generation) pattern (generation lines) formed on the print circuit board axially with a predetermined gap. For this reason, the magnetizing different from the rotor magnet 8 can be easily performed on the integrally formed rotor 2. An FG dedicated magnet of another member need not be provided as in the prior art. Accordingly, particular parts and labor are not required and these magnets can be magnetized while can be positioned accurately.

A prepressurizing spring 14 is inserted between the bearing 9 and a stepped portion 32 formed in the inner periphery 44 of the cylindrical portion 5. The bearing 10 is pressurized by the stopper ring 15 engaged with the shaft 1 and the stepped portion 31 of the cylindrical portion 5 and due to the effect of the prepressurizing spring 14.

In the above embodiment, an arrangement of the rotor magnet 8 of a so called outer rotor motor type has been described in which the rotor is coaxially arranged outwardly and radially of the stator 6. The rotor arrangement may adopt an inner rotor motor. The segment-shaped magnets can also be integrally formed by using the resin material having the magnetism. The rotor 2 whose length is longer in its length direction or a flat rotor 2 may be arbitrarily designed. The number of poles and the shape of the segment-shaped magnets can also arbitrarily be designed.

Second Embodiment

Figure 5:
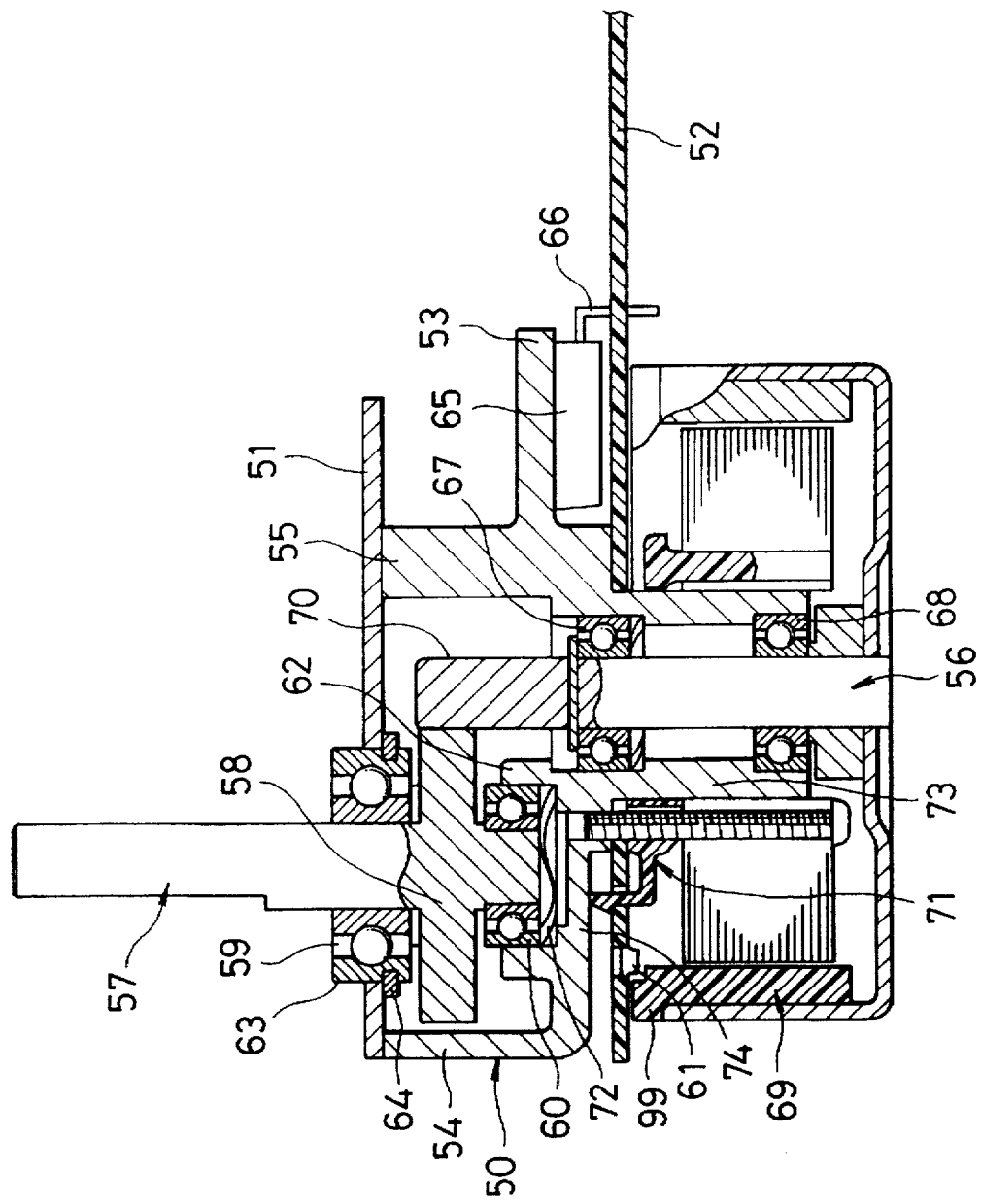
FIG. 5 is a cross sectional view showing an entire brushless motor according to second embodiment of the present invention.

FIG. 5 is a cross sectional view showing the second embodiment of the brushless motor of the present invention. The brushless motor shown in FIG. 5 is fundamentally identical with the brushless motor of the first embodiment, and therefore only difference will be described.

The brushless motor of the second embodiment is provided with a deceleration gear therein. A rotation detector 61 is mounted on a print circuit board 52 corresponding to the axial direction of a rotor magnet 69 as shown in FIG. 5. The rotation detector 61 outputs a detection signal corresponding to the rotation of the rotor magnet 69. An arrangement of the rotor magnet 69 is substantially the same as that shown in FIG. 2 which has already been explained except the magnetized state of a resin material forming portion 99 provided at the end in the axial direction (rotation detector 61 side). More specifically, one N or S pole is formed in a circumferential direction of the resin material forming portion 99 and the rotation detector 61 produces the detection signal.

A fixing frame 50 has a cylindrical portion 73 rotatably supporting the rotor magnet 69, circumferential wall 54 defining a housing space of gears, and a flange portion 53 corresponding to the print circuit board 52, which are integrally formed. Bearings 67, 68 are inserted into the cylindrical portion 73 of the fixing frame 50, to thereby rotatably support the motor shaft 56. A gear portion 70 is formed at the output side of the motor shaft 56. The gear portion 70 is engaged with a gear portion 58 of an output shaft 57. The output shaft 57 are supported by the bearings 59 and 60.

A bearing 60 is inserted in a receiving portion 62 provided on a flat portion 74 of the fixing frame 50. Since the receiving portion 62 is integrally formed with the fixing frame 50, the number of components can be reduced and assemble error such as axial dislocation can be minimized. A bearing 59 is engaged with a flange plate 51 which is fixedly stuck to the fixing frame 50. A bearing 59 is protected from being come out by a stopper ring 64 inserted in an outer ring portion of the bearing 59. According to the brushless motor of this embodiment, a so called spigot process is performed in which outer periphery portion 63 itself of the outer ring portion of the bearing 59 is engaged with a unit to be mounted. For this reason, a particular spigot process is not required in a flange portion, and therefore the making load can be reduced.

Electrical components are provided on a print circuit board 52. The fixing frame 50 is used for releasing the heat generated by the electrical components generating a great amount of heat. More specifically, an electrical component 65, such as a power-transistor which generates a great amount of heat is directly provided on the flange portion 53 integrally formed with the fixing frame 50. The lead-lines of the component 65 is connected to the print circuit board 52. According to such a structure, there is no need to use an exclusive heat-sink for releasing the heat generated by the electrical component 65. Therefore, the number of components can be reduced and the motor can be minimized.

The circuits for controlling the motor having the above structure will now be described below.

Third Embodiment

Figure 6:
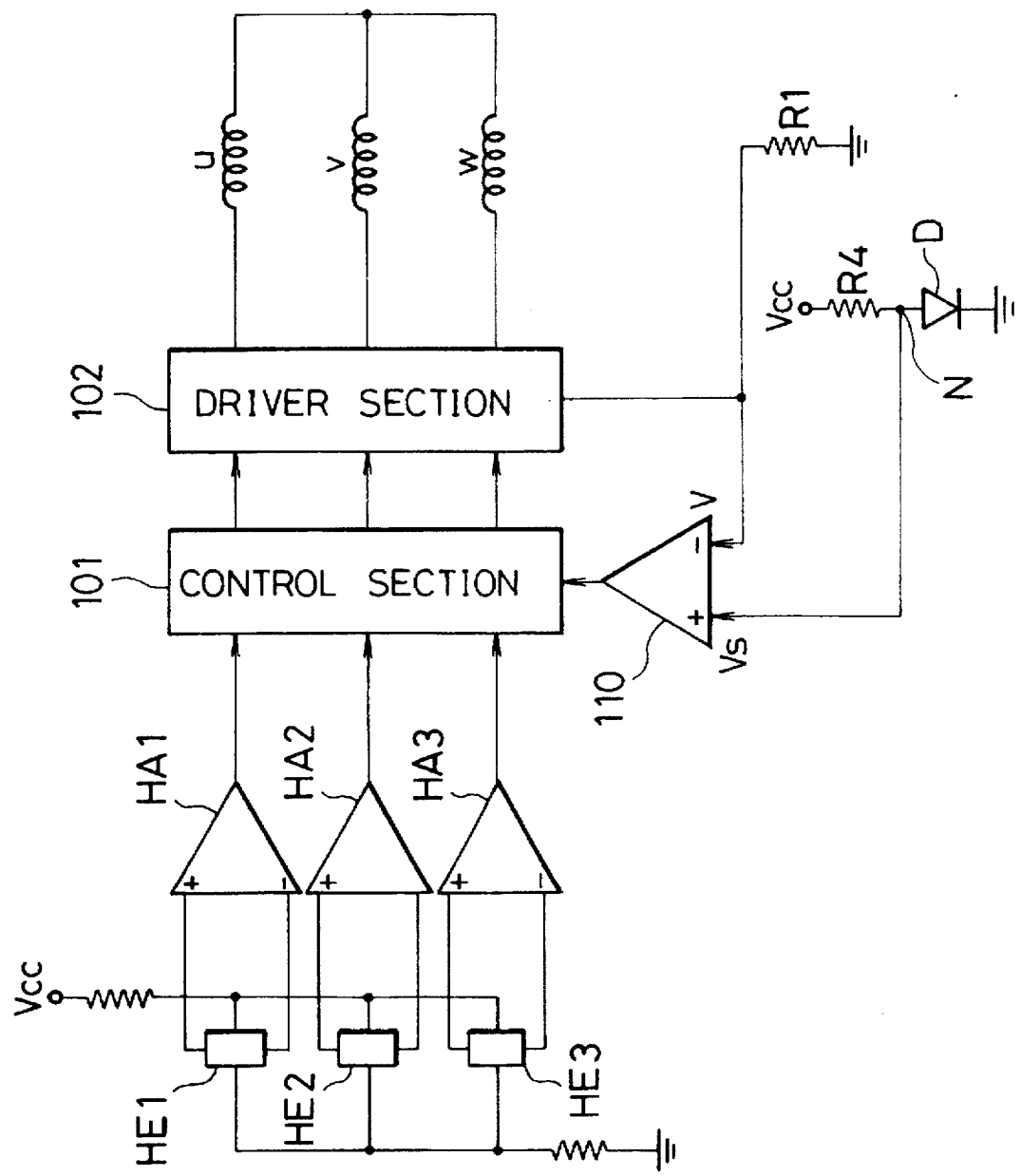
FIG. 6 is a circuit diagram of a rotation control circuit according to the third embodiment of the present invention.

FIG. 6 shows an embodiment of a rotation control circuit of a motor. In the following description, the same numerals are used for the same parts in the above described prior art shown in FIG. 15. The rotation control circuit shown in FIG. 6 is adapted to a three-phase spindle motor. The rotation control circuit includes Hall elements HE1 through HE3 for detecting the magnetic field applied from a rotor. Hall amplifiers HA1 through HA3 receiving and amplifying the outputs of the Hall elements HE1 through HE3, respectively. A control section 101 receives the outputs of the Hall amplifiers HA1 through HA3 and controls the exciting currents to be supplied to the three-phase stator coils u, v, and w, in accordance with the output signals of the Hall amplifiers HA1 through HA3. A driver section 102 receives the output signals of the control section 101 and supplies predetermined exciting currents to the stator coils u, v, and w, in accordance with the output signals of the control section 101.

The control section 101 is also supplied with an output of the current detecting circuit 110.

The current detection circuit 110 comprises a voltage-comparator. The negative input terminal of the current detection circuit 110 is connected to one terminal of a resistor R1 through which a current equal to one of the exciting currents to be supplied to the coils u, v, w from the driver section 102 flows. The current detection circuit 110 compares a converted voltage V of the exciting currents flowing through the resistor R1 with a reference voltage Vs to detect the increase of the exciting currents due to that the motor overruns by some reason or the number of revolutions of the motor is abnormally increased. The current detection circuit 110 sends a detection signal to the control section 101, to thereby cut off the supplement of the exciting currents to stop the motor.

Figure 15:
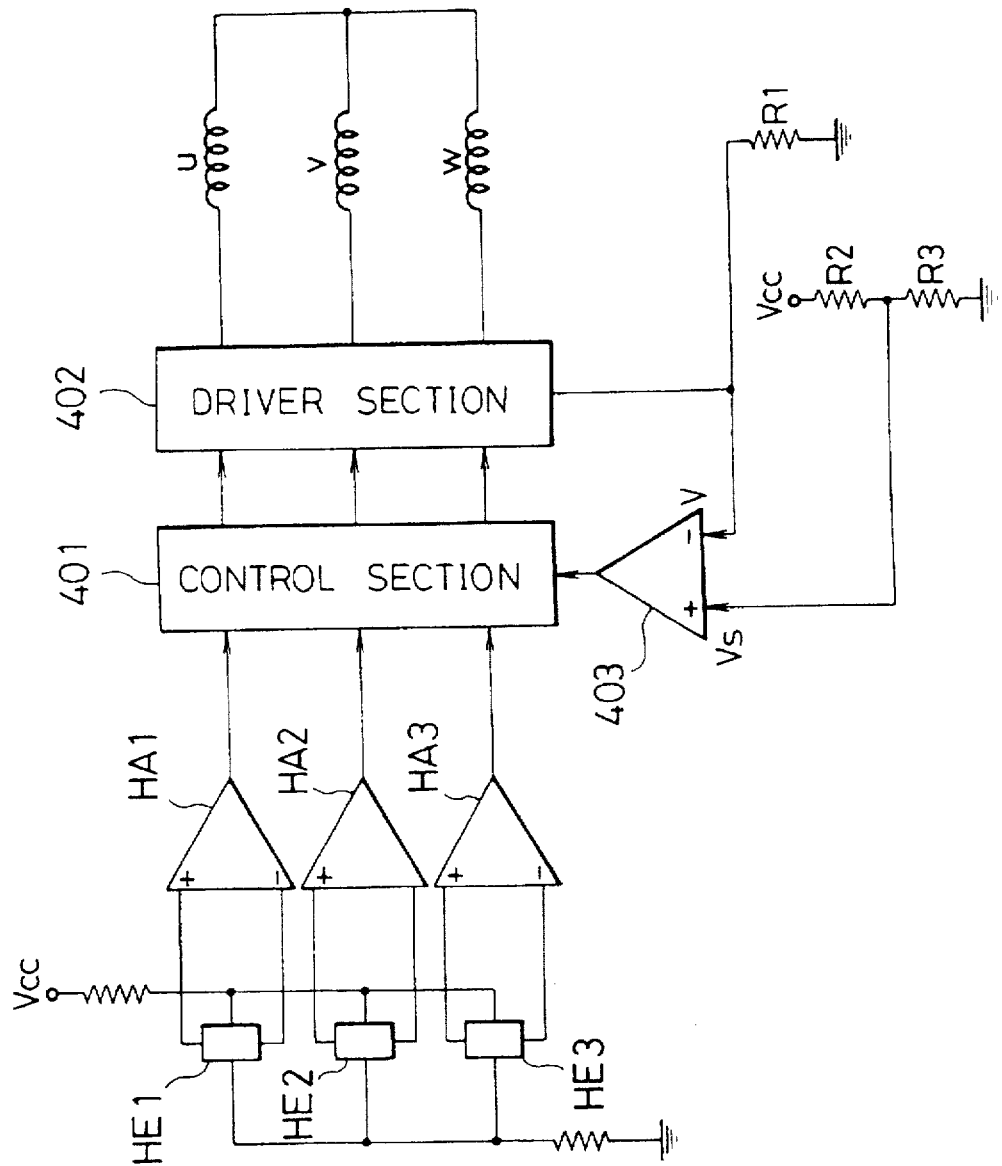
FIG. 15 is a circuit diagram showing a main part of a conventional rotation control circuit.
Figure 18:
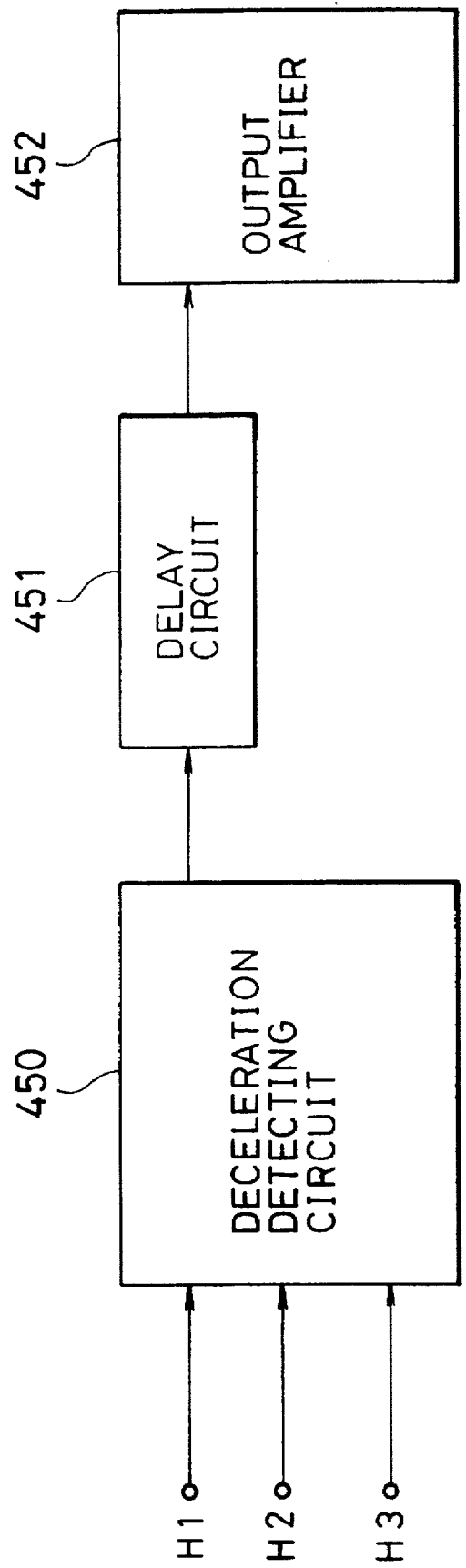
FIG. 18 is a block diagram showing a conventional brake circuit.
Figure 19:
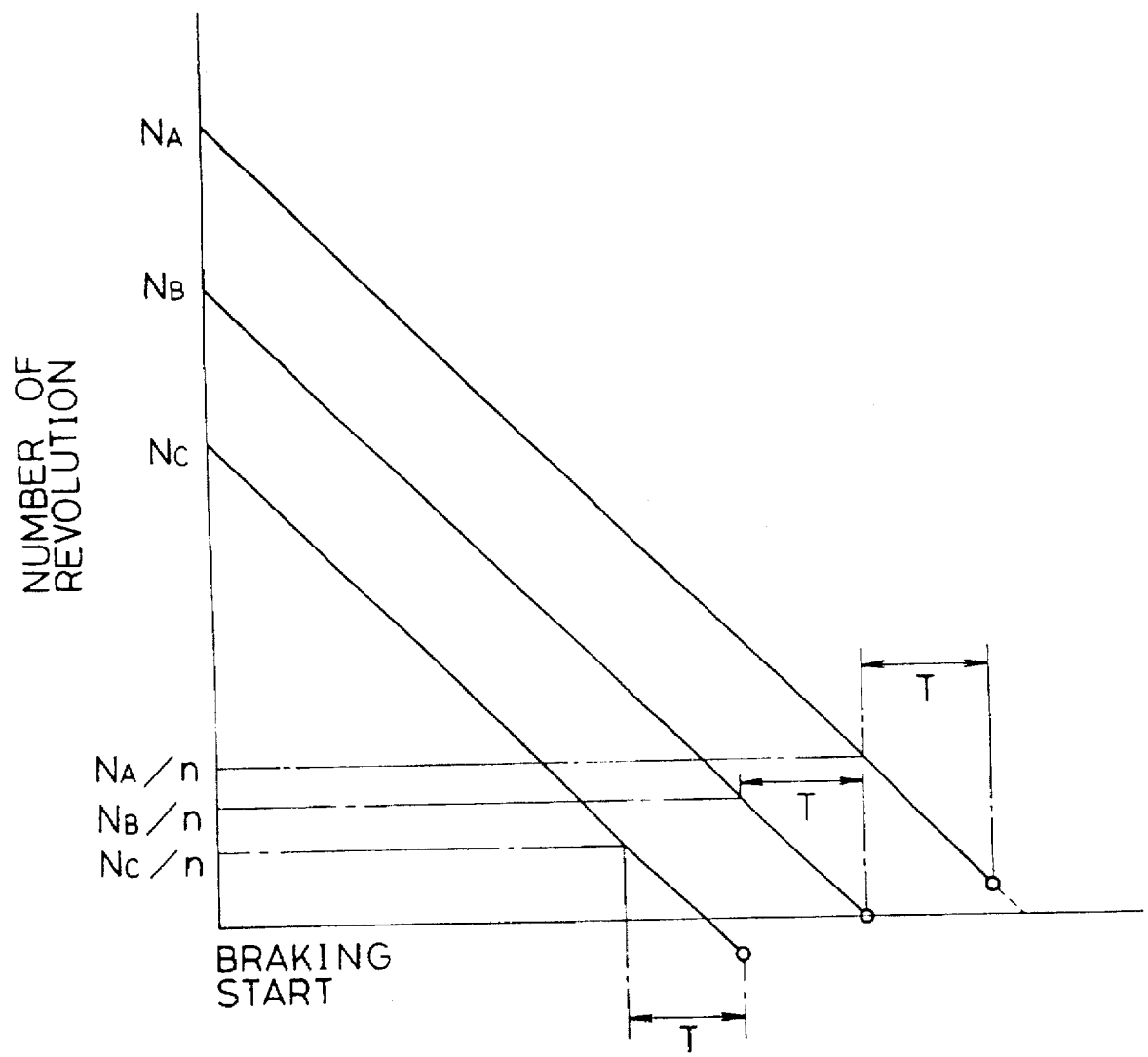
FIG. 19 is a graph showing number of revolutions in the brake operation according the prior art.

As stated above, the basic arrangement of the rotation control circuit is same as that in the prior art shown in FIG. 15. However, the current detection circuit 110 has the following feature.

According to the current detection circuit 110 of the present embodiment, the reference voltage Vs is obtained at a node N of a resistor R4 and an anode of a diode D serially connected between a power supply voltage Vcc and a ground voltage.

Variations of a forward voltage $V_F$ of a pn junction of the diode D is small. Accordingly, a stable reference voltage Vs can be obtained independent of the fluctuation of the current.

The forward voltage $V_F$ of the diode D is increased when a temperature becomes low and decreased when the temperature becomes high. In a motor, viscous resistance of a grease of a bearing of the motor is increased when the temperature become low and a mechanical loss is increased. Accordingly, the starting characteristic of the motor is comparatively lowered. According to the present embodiment, the reference voltage Vs is increased when the temperature becomes low, the current detecting circuit 110 does not operate even if the exciting currents to be supplied to the coils u, v, w of the motor are increased. Accordingly, the starting characteristic at low temperature can be improved.

In general, the reference voltage Vs is lowered when the temperature becomes high. Accordingly, the supplement of the exciting currents to the coils u, v, w of the motor is constrained and thus the trouble can be prevented in advance. Note that in the embodiment shown in FIG. 6, circuit for generating the reference voltage Vs is not limited to the diode D but may be a pn junction of a transistor, for example. Or any other known circuits whose output voltage varies in accordance ambient temperature may be used as a reference voltage generating circuit. The resistor R1 may be directly inserted between one of the stator coils u, v, w and the driver section 402.

As has been described, according to the rotation control circuit of the present embodiment, the reference voltage Vs of the current detection circuit 110 for determining the abnormal state of the motor has small variations and can be stabilized. Accordingly, the breakage due to the abnormal state can be effectively avoided.

Fourth Embodiment

Figure 7:
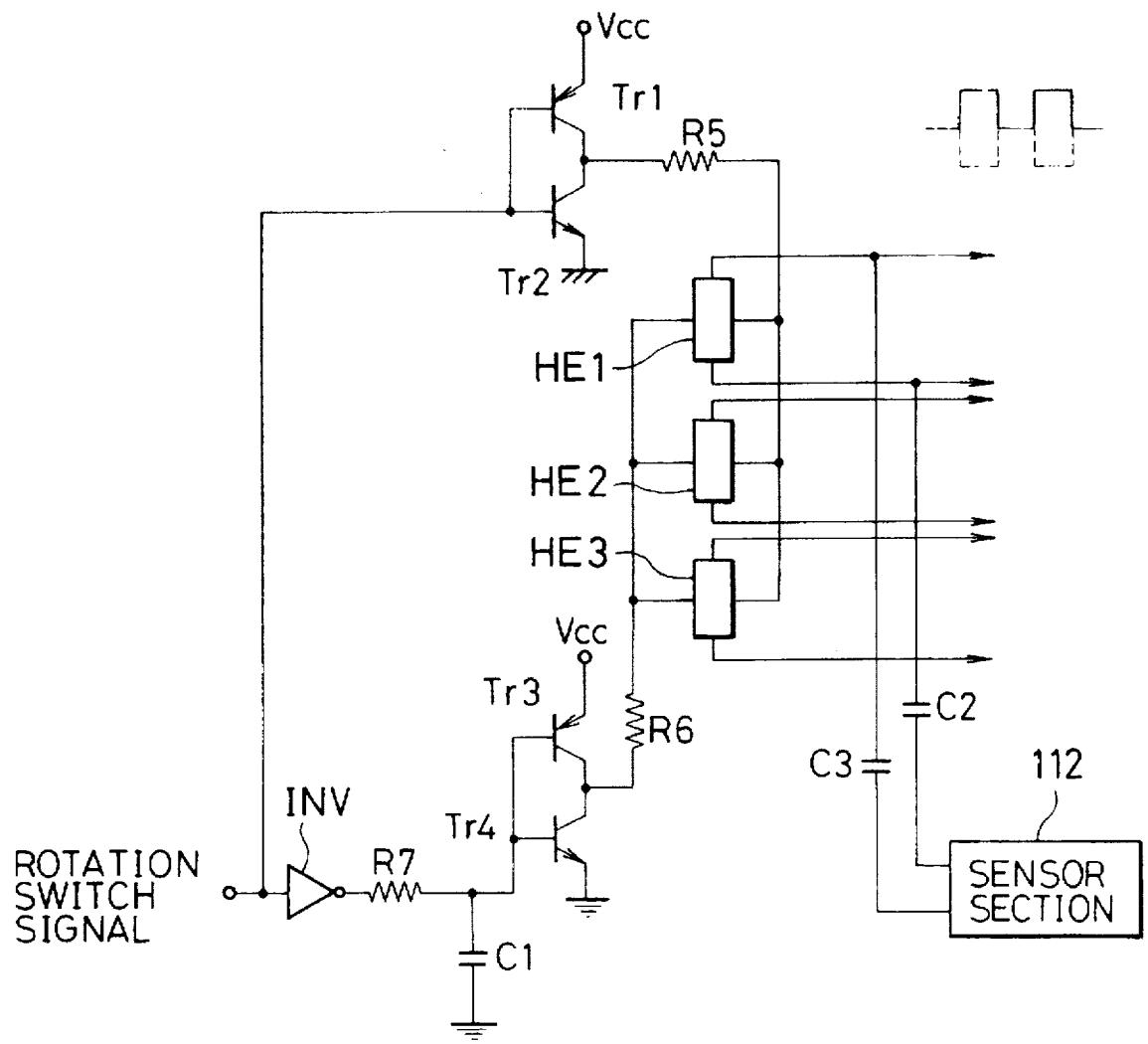
FIG. 7 is a circuit diagram showing a main part of the rotation control circuit according to the fourth embodiment of the present invention.

FIGS. 7 and 8 show another embodiment of the rotation control circuit of the motor. According to the embodiment shown in FIGS. 7 and 8, in addition to the generating section of the reference voltage Vs of the current detecting circuit 110 in the third embodiment, a driver circuit of the Hall elements HE1 through HE3 is improved. In the circuit shown in FIG. 7, a pair of a PNP transistor Tr1 and an NPN transistor Tr2 whose collectors and bases are commonly connected with each other are connected to input terminals of the Hall elements HE1 through HE3 via a resistor R5, a pair of a PNP transistor Tr3 and an NPN transistor Tr4 whose correctors and bases are commonly connected with each other are connected to an input terminal of the Hall elements HE1 through HE3 via a resistor R6.

A rotation switch signal I is directly input to the bases of the transistors Tr1 and Tr2. The rotation switch signal I is input to the bases of the transistors Tr3 and Tr4 through an inverter INV and a CR circuit (a capacitor C1 and a resistor R7). A sensor section 112 for detecting a leading interval (intervals between the leading edges) of a detection signal of the Hall element HE1 is connected to the output terminals of the Hall element HE1 through capacitors C2 and C3.

The reason for adopting such circuit will be described below.

In the prior art, a circuit shown in FIG. 16 has been used to control the Hall elements HE1 through HE3 by using the rotation switch signal I. The circuit shown in FIG. 16 is a circuit in which the inverter INV and the CR circuit (the capacitor C1 and the resistor R7) are removed from the circuit shown in FIG. 7, and the transistor Tr3 is formed of NPN transistor and transistor Tr4 is formed of PNP transistor. Assume now that the motor is rotating in a forward direction and the rotation switch signal I is at "H" level. The rotation switch signal I turns on the NPN transistors Tr2 and Tr3.

As a result, the power supply voltage Vcc is applied to the left side input terminals of the Hall elements HE1 through HE3 in FIG. 16.

Under this condition, each of Hall elements HE1 through HE3 outputs a signal having an output waveform shown by a solid line in FIG. 16. When a reverse rotation of the motor is instructed, the rotation switch signal I become at "L". This signal then turns on the PNP transistors Tr1 and Tr4. As a result, a power supply voltage Vcc is applied to the right side input terminals of the Hall elements HE1 through HE3 in FIG. 16.

A sensor section 412 detects the leading interval T of the output signal from the Hall element HE1. When the leading interval T is shortened, the motor speed becomes faster. Accordingly, when the leading interval T is equal to or smaller than a predetermined value, it is determined that the motor overruns. As a result, the sensor section 412 sends a signal to the control section 401 to stop the motor.

According to the circuit shown in FIG. 16, the rotation switch signal I is simultaneously input to the transistors Tr1 through Tr4. For this reason, the circuit in FIG. 16 has the following drawbacks. As shown in FIG. 17A, when the rotation switch signal I is input after the leading edge of the output signal of the Hall element HE1, this signal changes a direction of the voltage to be applied to the Hall element HE1 through HE3, as described above. As a result, the output signal of the Hall element HE1 becomes a state as shown in FIG. 17B.

When the output signal of the Hall element HE1 becomes a state shown in FIG. 17B, the leading interval T' of the signal becomes extremely shorter than a normal leading interval T. As a result, the sensor section 412 erroneously determines that the motor overruns.

According to the present embodiment, the rotation switch signal I is supplied to the bases of the transistor Tr3 and Tr4 through the inverter INV and the CR circuit (a capacitor C1 and a resistor R7).

According to such a structure, when the motor is being rotated in a forward direction, the rotation switch signal I is at "H" level which turns on the transistors Tr2 and Tr3. As a result, the power supply voltage Vcc is applied to the left side input terminals of the Hall elements HE1 to HE3 in FIG. 7. When the reverse rotation is instructed, the rotation switch signal I becomes at "L" level which turns on the transistors Tr1 and Tr4. As a result, the power supply voltage Vcc is applied to the right side input terminals of the Hall elements HE1 through HE3 in FIG. 7.

Figure 8A:
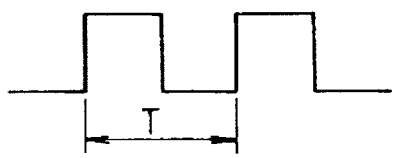
FIGS. 8A and 8B show waveforms of output signals of Hall elements shown in FIG. 7.
Figure 8B:
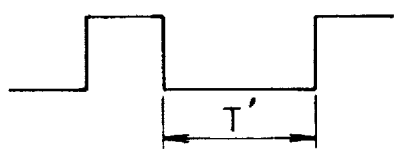

Even if the level of the rotation switch signal I is switched following to the leading edge of the output signal of the Hall element HE1 as shown in FIG. 8A, the transistor Tr3 does not operate until a voltage across the capacitor C1 reaches a predetermined value. In other words, the insertion of the inverter INV and the CR circuit delay the operation of the transistors Tr3 and Tr4. As a result, the output waveform of the Hall element HE1 exhibits as shown in FIG. 8B. Therefore, the leading interval T' becomes longer than the normal leading interval T so that the erroneous determination by the sensor section 112 can be avoided.

According to the rotation control circuit, even if the rotation switch signal I for reversing the motor rotation is input, the stable reverse operation can be obtained without erroneous stopping operation.

Fifth Embodiment

Figure 9:
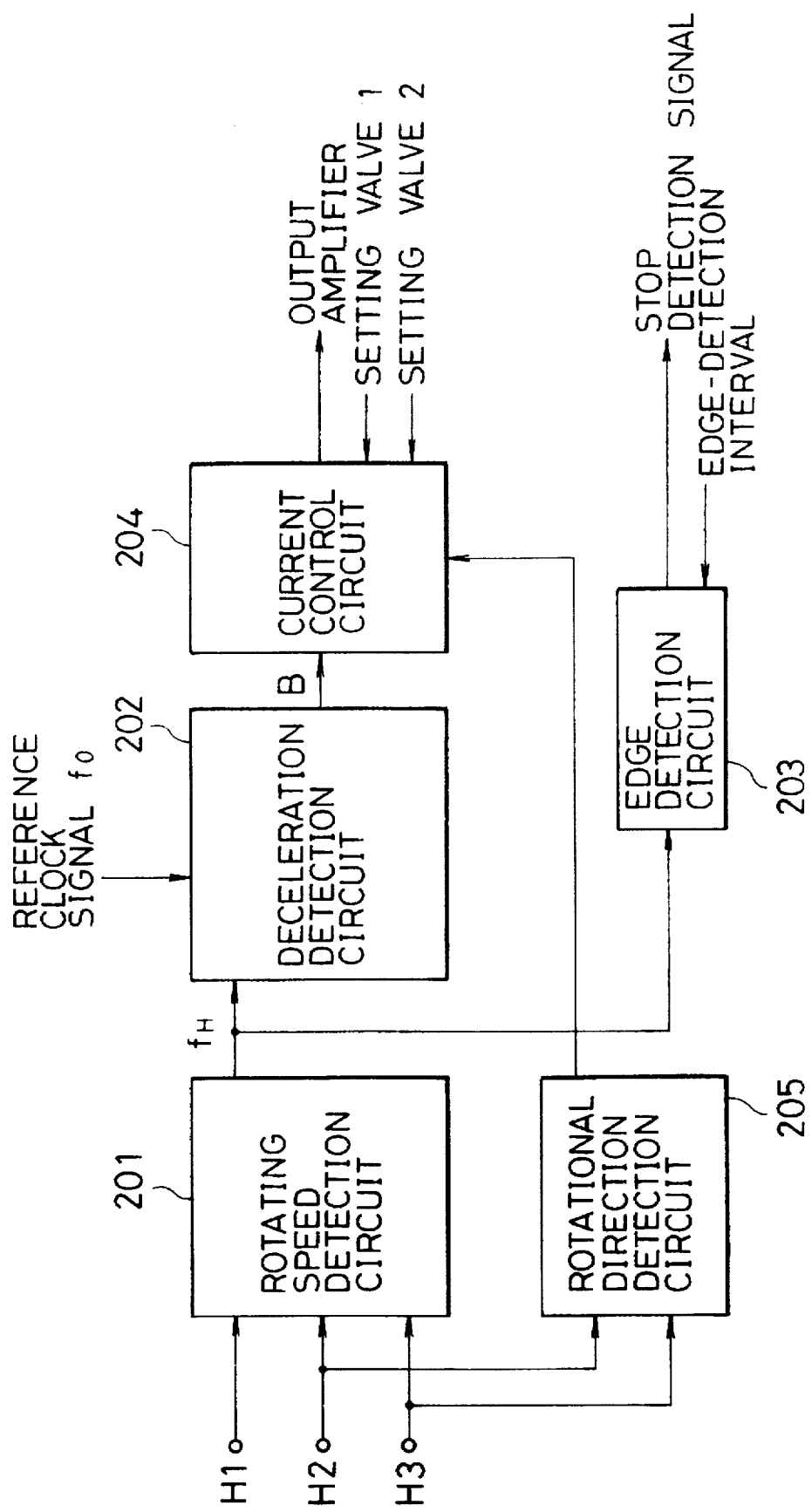
FIG. 9 is a block diagram of a brake circuit according to the fifth embodiment of the present invention.
Figures 10A, 10B:
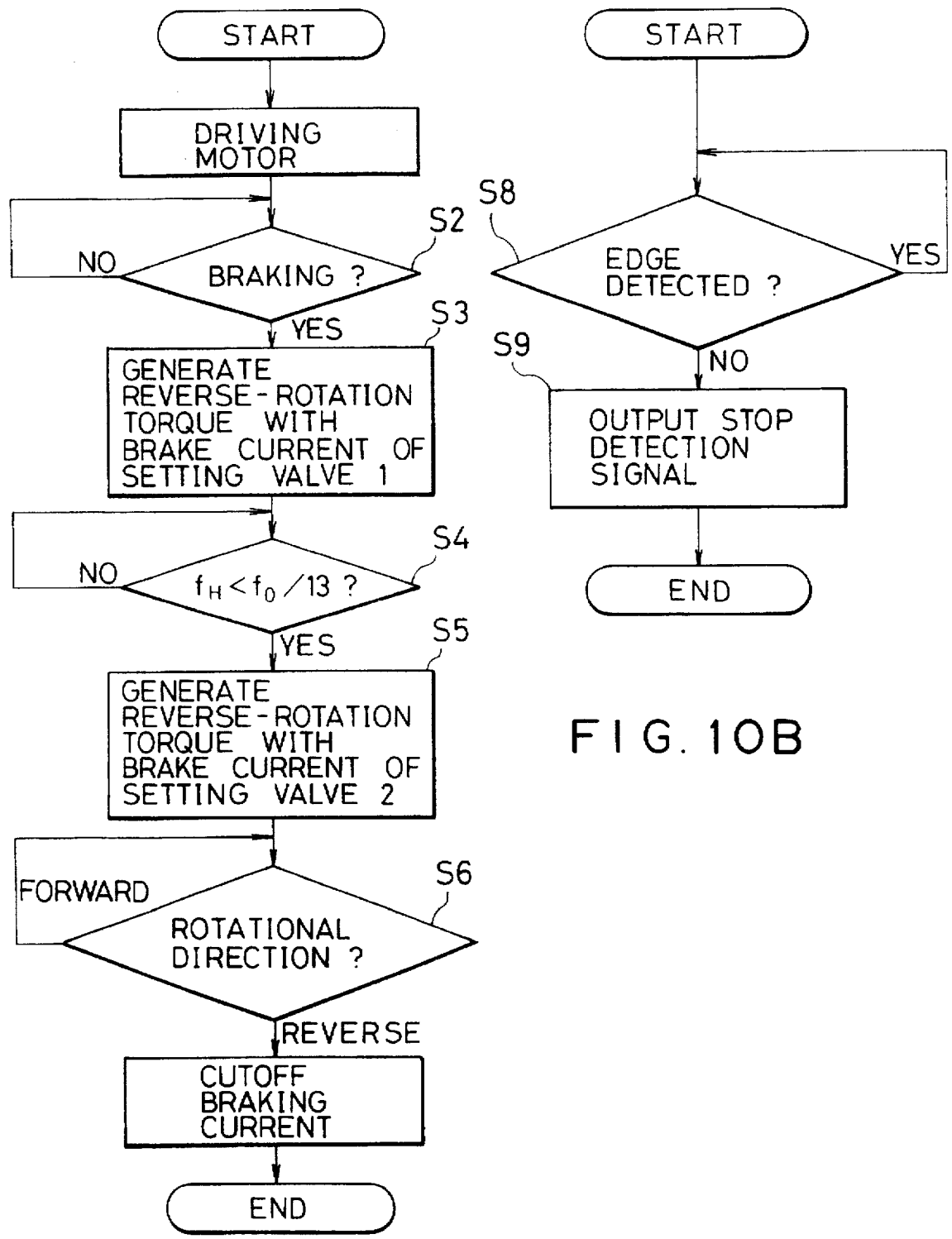
FIGS. 10A and 10B are flowcharts showing operation procedures of the brake circuit shown in FIG. 9.
Figure 12:
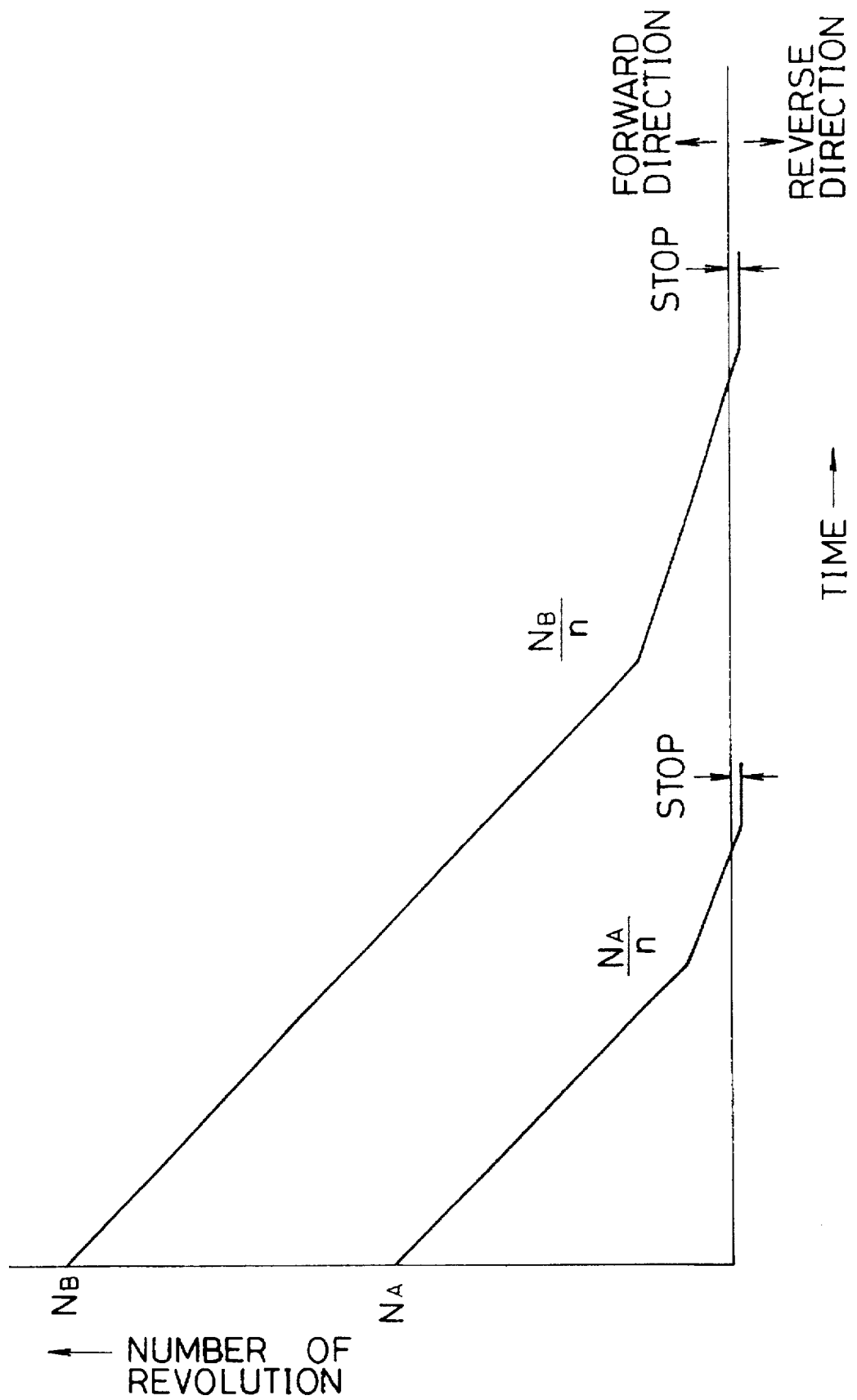
FIG. 12 is a graph showing number of revolutions in the brake operation in FIG. 9.

An embodiment of a brake control circuit of the motor according to the present invention will now be described with reference to FIGS. 9 through 12. FIG. 9 is a block diagram of the brake control circuit. FIG. 10A is a flowchart showing a braking procedure. FIG. 10B is a flowchart showing a stop-detecting procedure. FIGS. 11A to 11E are timing charts showing signals of the components shown in FIG. 9. FIG. 12 is a graph showing a number of revolutions when the brake operation is performed.

In FIG. 9, a rotating speed detection circuit 201 synthesizes (obtains an exclusive-OR of) output signals from three Hall sensors H1, H2, H3 for detecting a rotary position of the rotor, and outputs a rotational frequency signal whose frequency is $f_H$ to a deceleration detection circuit 202 and an edge detection circuit 203. The frequency $f_H$ corresponds to the rotating speed of the rotor.

The deceleration detection circuit 202 is a circuit for determining whether or not the rotating speed of the rotor reduced to a predetermined value with respect to a rated rotating speed. The deceleration detection circuit 202 receives the rotational frequency signal and a reference clock signal whose frequency is $f_0$, compares them, and outputs a signal B to a current control circuit 204 when the frequency $f_H$ becomes the predetermined value or less with respect to the reference clock $f_0$. In this embodiment, the deceleration detection circuit 202 outputs the signal B to the current control circuit 204 when $f_H < f_0/13$ is satisfied.

A current control circuit 204 controls a brake current value to driving coils for driving the rotor. More specifically, the current control circuit 204 switches the brake currents of setting value 1 and setting value 2, and outputs one of the brake currents to an output amplifier. When the setting value 1 is selected, the brake operation is performed at full torque by a brake current I1. When the setting value 2 is selected, the brake operation is performed with a brake current I2 which is smaller than the brake current I1. In this embodiment, the brake currents I1 and I2 are set within a range of I2=I1/5 to I1/15 from its motor characteristic.

An edge detection circuit receives the rotational frequency signal from the rotating speed detection circuit 201 to detect its edge (leading edge and/or trailing edge). The edge detection circuit 203 outputs a stop detection signal when edge of the rotational frequency signal is not detected during a set edge-detection interval (setting time).

A rotational direction detection circuit 205 detects a rotational direction of the rotor in accordance with the signals from the two Hall sensors H2 and H3. When the rotational direction of the rotor is reversed during the braking operation, the rotational direction detection circuit 205 outputs a signal to the current control circuit 204. In response to this signal, the current control circuit 204 cuts off the brake current.

A brake procedure performed by the brake control circuit is shown in the flowcharts of FIGS. 10A and 10B. More specifically, when the brake operation is performed (step S2) while the motor is being driven (step S1), a reverse-rotation torque of the rotor is generated by the brake current I1 corresponding to the setting value 1. As a result, the brake operation is performed at full torque. When the deceleration detection circuit 202 detects that the rotating speed becomes a predetermined value or less, namely $f_H < f_0/13$ is satisfied (step S4), the current control circuit 204 switches from the brake current I1 to the brake current I2 corresponding to the setting value 2, to reduce the brake current. As a result, the brake operation with minimum reverse torque is performed (step S5). When the rotor completely stops or starts the reverse rotation, the rotational direction detection circuit 205 detects this (step S6), and the current control circuit 204 cuts off the brake current (step S7).

When the edge detection circuit 203 does not detect an edge of the rotating speed signal supplied from the rotating speed detection circuit 201 during the edge detection interval (step S8), the circuit 203 outputs the stop detection signal (step S9). This edge detection (steps S8, S9) and the brake operation (steps S1 to S7) are performed in parallel.

The timing charts of each output signals during this operation is shown in FIGS. 11A to 11E. FIG. 11A shows the waveform of the reference clock signal which has a predetermined frequency $f_0$. FIG. 11B shows the waveform of the rotational frequency signal. FIG. 11C shows the waveform of the brake current. FIG. 11D shows the rotating direction of the rotor, and FIG. 11E shows the waveform of the stop detection signal.

As described above, by detecting the reverse rotation of the rotor and cutting off the brake current, a stable brake operation is performed by the brake control circuit even if the rated number of revolutions $N_A$ and $N_B$ are changed as shown in FIG. 12.

According to the brake control circuit, the brake torque is reduced when the number of revolution becomes a predetermined value or less with respect to the rated number of revolution after the brake operation is performed, and the brake current is cut off in synchronism with the start of reverse rotation of the rotor. A stable brake operation can be performed with respect to motors having different rated number of revolutions.

The above-described brake operation of a motor can also be achieved by the following sixth embodiment.

Sixth embodiment

Figure 13:
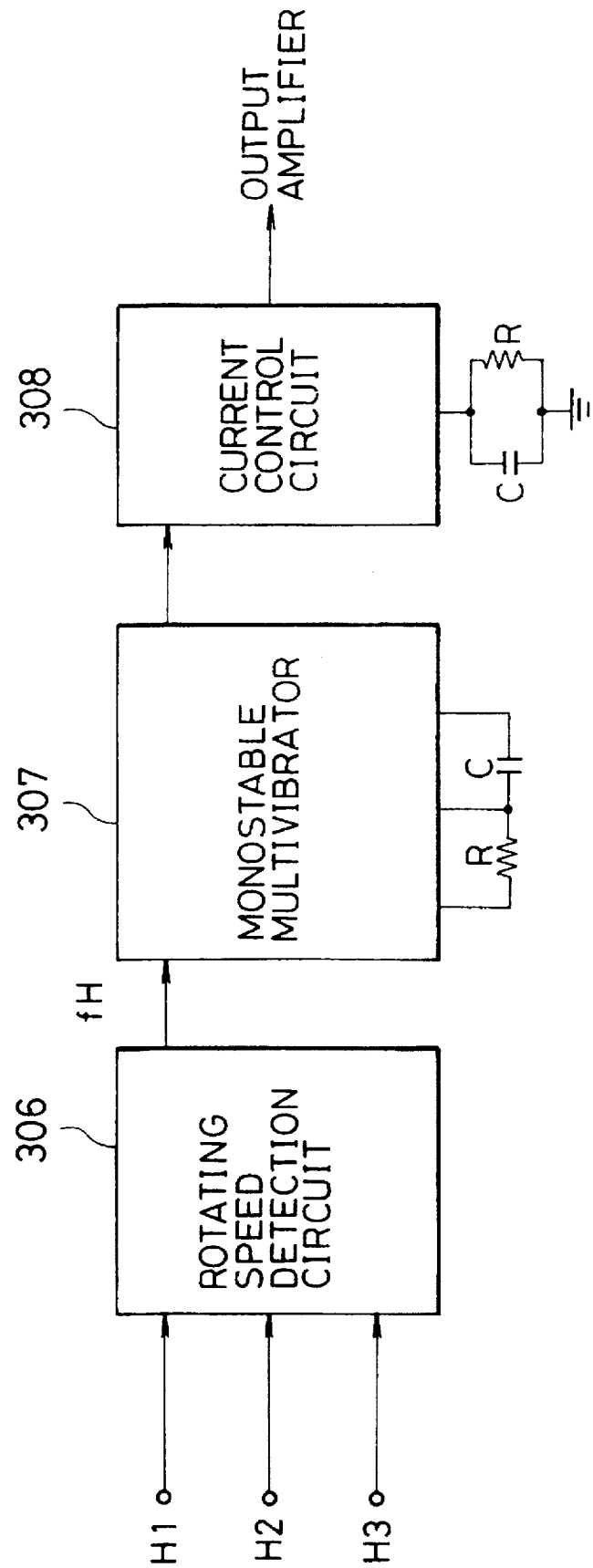
FIG. 13 is a block diagram of a brake circuit according to the sixth embodiment of the present invention.

In the block diagram shown in FIG. 13, the rotating speed detection circuit 306 is the same as that in the fifth embodiment. A monostable multivibrator 307 is a retriggable type and generates a high level pulse signal in response to a leading or trailing edge of the trigger signal. The generated pulse has a pulse width which is set by adjusting the CR circuit connected to the monostable multivibrator 307. The monostable multivibrator 307 is repeatedly triggered by the rotating frequency signal before the output pulse goes down when the frequency fH is greater than a predetermined value (when the period of the rotating frequency signal is smaller than the pulse width). In this case, the output signal of the monostable multivibrator 307 maintains a high level. On the other hand, when the frequency fH is equal to or smaller than the predetermined value, the output signal of the monostable multivibrator 307 at least momentarily becomes a low level.

A current control circuit 308 is a circuit for controlling the brake current.

According to the sixth embodiment, when the brake operation is performed, the reverse-rotation torque is generated in the rotor by the first brake current of first current level, to thereby perform the brake operation at a full torque. When the rotating speed reaches the absolute number of revolutions, the monostable multivibrator 307 generates a low level signal. In response to the low level signal, the current control circuit 308 switches from the first brake current to the second brake current of a second current level smaller than the first current level. As a result, the brake operation is performed by a small reverse rotation torque by using the second brake current. The second brake current is gradually decreased, to thereby smoothly stop the rotation.

Even if the rated number of revolutions is changed in any way, the brake operation is switched to the minimum brake operation using the brake current of setting value 2 upon detecting that the rotating speed of the motor reduces to the absolute number of revolutions. As a result, a stable brake operation can be achieved.

The second brake current is gradually decreased. Therefore, the brake torque will be zero when the motor is almost sopped. Accordingly, there is no overbraking or underbraking.

According to the brake control circuit of the sixth embodiment, it is detected that the number of revolutions reduces to a preset number of revolutions. Thereafter, the brake torque is reduced, to thereby perform further brake operation with a small brake torque. Accordingly, the stable brake operation can be achieved even if the rated number of revolutions and the reference clock are changed.

The second brake current whose current level decreases in accordance with time elapse may be generated with many known methods. For example, it may be generated using a transient phenomenon. More specifically, for example, when the monostable multivibrator 307 generates the low level signal, the current control circuit 308 charges the capacitor C connected thereto. Then the current control circuit 308 starts to generate a second brake current whose current level is correspond to the voltage across the capacitor C. As the voltage decreases by the transient phenomenon, the current control circuit 308 decreases the brake current.

A seventh embodiment will now be described where a motor can be stopped quickly.

Seventh Embodiment

In the motor-drive ICs, a timing at which full torque is applied for braking is normally determined by a Hall mode according to signals from the Hall sensors. For example, the motor-drive IC "LB1825" (manufactured by SANYO corporation, Japan) has one-Hall mode (a mode in which one Hall sensor is used for controlling (driving and braking) the motor) and three-Hall mode (a mode in which three Hall sensors are used for controlling the motor). In the one-Hall mode, the full torque is applied up to $f_{FG}/2$ and in the three-Hall mode, the full torque is applied up to $f_{FG}/8$ in the braking. Note that $f_{FG}$ is a FG frequency at the rated rotation of the motor.

Assume now that when an 8-pole motor is being rotated at 3000 rpm of rated number of revolutions, one Hall sensor generates 4 pulses per one round. In this case, $f_{FG}$=(3000 rpm/60 sec)×4 pulses=200 Hz in the one-Hall mode and $f_{FG}$=600 Hz in the three-Hall mode. Accordingly, in the brake operation, the full torque can be applied up to $f_{FG}/2$= 100 Hz in the one-Hall mode and up to $f_{FG}/8$=75 Hz in the three-Hall mode. In other words, the braking at full torque is performed up to the number of revolutions being reduced to 500 rpm in the one-Hall mode and to 375 rpm in the three-Hall mode.

For this reason, in this embodiment a Hall mode switching circuit 351 is connected to the motor-drive IC 353 to drive the motor 355 as shown in FIG. 14. The Hall mode switching circuit 351 sends a mode control signal to a mode setting terminal of the motor-drive IC 353 to set the motor-driver IC 353 in the one-Hall mode having a good FG precision in the normal rotation, and switches the mode to the three-Hall mode in response to the braking signal in the brake operation. Due to this, the full torque can be applied in the brake operation up to immediately before the cease of the motor, to thereby reduce the time required for stopping the motor.

What is claimed is:

1. A brake control system of a brushless motor comprising:

a brake control circuit having single and three Hall modes in which the motor is driven in accordance with signals from Hall sensors, for controlling the brushless motor; and a mode setting circuit, connected to the brake control circuit, for setting the brake control circuit in the three Hall mode in which a full-torque brake operation becomes longer compared with the single Hall mode when the braking is performed.

2. A brake control circuit of a motor, comprising:

a speed detection circuit for detecting a rotating speed of a motor;

a deceleration detection circuit for detecting that a number of revolutions becomes a predetermined value or less with respect to a rated number of revolutions;

a rotational direction detection circuit for detecting a rotational direction of the motor; and a current control circuit connected to the deceleration detection circuit and rotational direction detection circuit for controlling a supplement of currents to stator coils of the motor to perform a brake operation with a current having a first current value (I1), performing the brake operation with a current having a second current value (I2) smaller than the first current value when the deceleration detection circuit detects that the number of revolutions is a predetermined value or less with respect to a rated number of revolutions, and for stopping the supplement of the current to the stator coils when the rotational direction detection circuit detects a reverse rotation of the motor, the relationship between I1 and I2 being I2=I1/5 through I1/15.

3. A brake control circuit of a motor, comprising:

a speed detection circuit for detection a rotating speed of the motor;

a revolution detection circuit for detecting that the number of revolutions of the motor reaches a predetermined value;

a current control circuit for controlling currents supplied to stator coils of the motor; and braking means for performing a first brake operation with a first brake current having a first current value, and for performing a second brake operation with a second brake current whose current value is gradually decreased from the first current value when the revolutions detection circuit detects that the number of revolutions of the motor reduces to the predetermined value, the second brake current being gradually reduced in accordance with a discharging of a capacitor.

* * * * *